United States Patent
Anup et al.

(10) Patent No.: US 7,583,410 B1
(45) Date of Patent: Sep. 1, 2009

(54) SYSTEM TO CREATE IMAGE TRANSPARENCY IN A FILE GENERATED UTILIZING A PRINT STREAM

(75) Inventors: Anup, Noida (IN); Ajay K. Pande, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 601 days.

(21) Appl. No.: 11/304,321

(22) Filed: Dec. 13, 2005

(51) Int. Cl.
    *H04N 1/40* (2006.01)
(52) U.S. Cl. .................................. 358/2.1; 358/1.9
(58) Field of Classification Search .................. 358/1.9, 358/2.1, 1.6, 1.15, 1.18, 506
    See application file for complete search history.

(56) References Cited

U.S. PATENT DOCUMENTS

| | | |
|---|---|---|
| 5,687,303 A | 11/1997 | Motamed et al. |
| 6,020,897 A | 2/2000 | Carlsen et al. |
| 6,025,927 A | 2/2000 | Honma |
| 6,049,339 A | 4/2000 | Schiller et al. |
| 6,230,174 B1 | 5/2001 | Berger et al. |
| 6,313,847 B1 | 11/2001 | Carlsen |
| 6,456,295 B1 | 9/2002 | Schiller |
| 6,515,675 B1 | 2/2003 | Bourdev |
| 6,678,072 B1 | 1/2004 | Matsuoka et al. |
| 6,720,977 B1 | 4/2004 | Bourdev |
| 6,825,852 B1 | 11/2004 | Hamburg |
| 2004/0086156 A1 | 5/2004 | Furukawa et al. |
| 2004/0125404 A1 | 7/2004 | Isshiki |
| 2007/0121160 A1 | 5/2007 | Markovic |

FOREIGN PATENT DOCUMENTS

| | | |
|---|---|---|
| WO | WO-2007064851 A2 | 6/2007 |
| WO | WO-2007064851 A3 | 6/2007 |

OTHER PUBLICATIONS

"A designers guide to transparency to print output using Adobe Creative Suite software", White paper,33 pgs.
"Adobe Acrobat Distiller 6.0", Product description,2 pgs.
"Adobe PDFMaker Help: Using Help", Using Acrobat PDFMaker 5.0 (Windows),19 pgs.
"Advanced Skills: Advanced Image Editing", *University of Leicester*, 4 pgs.
"Discription of the guidelines for choosing the appropriate picture format in an Office XP program", Article ID 320314. For a Microsoft PowerPoint 2000 version of article see 272399 (http://support.micrsoft.com/kb/272399).,(Sep. 10, 2004),8 pgs.
"Portable Network Graphics (PNG)", from Wikipedia , the free encyclopedia http://en.wikepedia.org/wiki/Png,7 pgs.
"PostScript", 8 pgs.

(Continued)

*Primary Examiner*—Thomas D Lee
*Assistant Examiner*—Stephen M Brinich
(74) *Attorney, Agent, or Firm*—Schwegman, Lundberg & Woessner, P.A.

(57) ABSTRACT

A method to generate image transparency in a file created from a print stream includes accessing a source file of a source application, extracting transparency information from an image within the source file to generate a non-transparent image prior to generating a print stream based on the source file, and replacing the transparency information in a print file generated utilizing the print stream.

16 Claims, 7 Drawing Sheets

OTHER PUBLICATIONS

"Transparency in PDF", *Adobe Developer Technologies*, Technical note #5407,82 pgs.

Kuchinskas, Susan , "Microsoft readying a PDF-killer", *WinPlanet Windows Software*, http://www.winplanet.com/article/2848-.htm,(2005),3 pgs.

Lancaster, Don , "Some Postscript transparency experiments using Acrobat 5.0", http://www.tinaja.com,(2002),7 pgs.

"International Application No. PCT/US 06/45940, International Search Report Oct. 5, 2007", 4 pgs.

"International Application No. PCT/US 06/45940, Written Opinion Oct. 5, 2007", 7 pgs.

SYSTEM TO CREATE IMAGE TRANSPARENCY IN A FILE GENERATED UTILIZING A PRINT STREAM

FIELD

This application relates to a method and system to process an electronic document and, in one example embodiment, to a method and system to process image transparency in a file generated utilizing a print stream.

BACKGROUND

The real world is made up of objects that are either transparent (e.g., clear glass), semi-opaque (e.g., tinted glass) or opaque (e.g., not-see through, such as granite). The representation of such real world objects in digital images requires that these transparency characteristics be accurately reflected. A number of digital media design tools (e.g., Adobe Photoshop® CS, Adobe Illustrator® CS, and Adobe InDesigne CS) provide the ability to create digital objects (e.g., images) that are transparent, semi-opaque or opaque. Such design tools typically allow a designer to specify the opacity of an object, from totally opaque to totally transparent, and also to change the appearance of objects by applying transparency effects (e.g., blending, soft drop shadows, feather edges, etc).

Separately, so as to enable both digital and physical printing of documents from multiple applications, a number of page description languages have been developed to enable the creation of both digital and physical print documents from a print stream. Such page description languages include, for example, the PostScript® (PS) language and the Portable Document Format (PDF) file format, both developed by Adobe Systems Inc. for representing documents in a manner that is independent of an original application software, hardware or operating system. While dot matrix, ink jet and laser printers widely deploy PostScript® to enable the printing of physical documents, PostScript® may of course also be utilized to "print" digital documents. Further, there are a number of applications available that utilize PostScript® as a display technology (e.g., Display PostScript® (DPS) and MeWS).

PDF creation tools are also widely available (e.g., PDFMaker developed by Adobe Systems Inc. of San Jose, Calif.) and provide services to a wide range of applications so as to enable these applications to print digital documents in the PDF format. For example, PDFMaker is a generic name for several add-ins that are added to PowerPoint, Word, Excel and another programs upon installation of the Adobe Acrobat® suite of programs.

Applications that enable the creation (e.g., printing) of digital documents, as noted above, typically utilize a print stream emitted from a print driver as input for the creation of the digital print document. Moreover, the print streams delivered by such source applications have different ways of dealing with transparency in images that may be included within a source document. For example, a PDF file may be created from a PostScript® (PS) stream generated by the print driver. However, mechanisms for a generating a print stream may lack support for transparency, and accordingly the inclusion of transparency information in such a print stream presents a number of challenges.

One prior art manner of dealing with this challenge is for the source application to create a transparency effect by detecting an image having associated transparency information, breaking the relevant image into multiple tiny micro-images arranged in a "sieve" formation, and then creating spaces between surrounding images. For example, FIG. 1 shows an example image 1, having associated image data 2 that includes transparency data 4 (e.g., alpha channel information) which defines the transparency (or opacity) of the image 1. When generating a print stream 6 for the relevant image 1, a print driver may emit the print stream 6 to include thousands of micro-images 7 (e.g., typically of 1-3 pixels in width and height) in a grid or sieve formation 8 with spaces 9 between adjacent micro-images 7. Accordingly, there are small gaps between the micro-images, the gaps being dimensioned of the same order as the image dimension. This sieve formation 8 of small images enables objects, below the image 1 in a z-order, to be partially visible, thus providing a near-transparency effect. Document formats that are generated from the print stream 6 (e.g., PDF files) then also use this sieve formation of micro-images for transparency representation.

It will however be appreciated that representing transparency in the manner depicted in FIG. 1 may result in the creation of thousands of micro-images. This in turn creates a large overhead in file size, as image compression techniques may be rendered ineffective on such tiny micro-images. Further, the time required by a printing application for final document generation is increased as a large print stream 6 needs to be generated and processed. Finally, using the above described sieve-formation, print applications may fail to create various levels of transparency, and effects such as transparency gradient. Accordingly, the resulting digital file may suffer from poor transparency quality.

SUMMARY

According to an example aspect, there is provided a method to generate image transparency in a file created from a print stream. The method includes accessing a source file of a source application, extracting transparency information from an image within the source file to generate a non-transparent image prior to generating a print stream based on the source file, and replacing the transparency information in a print file generated utilizing the print stream.

Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

An example algorithm is described that operates to strip transparency information (e.g., alpha channel information) from one or more images (e.g., a Graphics Interchange Format (GIF), a Tagged Image File Format (TIFF), or Portable Network Graphics (PNG) formatted images) prior to generation of a print stream (also known as a print data stream) that includes image information, and then to re-associate the extracted transparency information with the images in a file (e.g., a print file) created from the print stream. Accordingly, in the example embodiment, the extracted transparency information may be removed from a print channel that does not inherently support transparency information. The extracted transparency information may then be provided to a print creation application such that it bypasses the print channel. In one embodiment, the transparency information may selectively be stripped from images, dependent on whether or not the print channel utilized by the source application inherently supports transparency information. In this way, in one example embodiment, a print stream may be generated that does not include transparent images, where the print channel does not inherently support transparency information.

The print stream may comprise a binary data stream of the type that is sent to a printer from a print driver to produce a print created document. The binary data stream may include informational content to be printed in the print created document, as well as formatting codes, printer control codes, and image data. The term "print stream" is used herein broadly to refer to information of the type to be sent to a printer, be a physical or virtual printer, from a print driver. The term may include an entire sequence of data to be sent to a printer in one or more print jobs, and may also include only a portion of a sequence to be sent to the printer.

Print streams may for example be written in one of several established languages, sometimes referred to as page description languages or print data stream types. Examples of such types include ASCII, several generations of the PCL language from Hewlett-Packard, the PostScript® language from Adobe Systems, Inc., and the Advanced Function Presentation or AFP language from IBM Corporation. A large enterprise-wide computer system will generally include numerous printers sometimes requiring print streams of different types, and the stream originating at any given time in any given department of the enterprise may thus be one of several different types.

Figure 1:
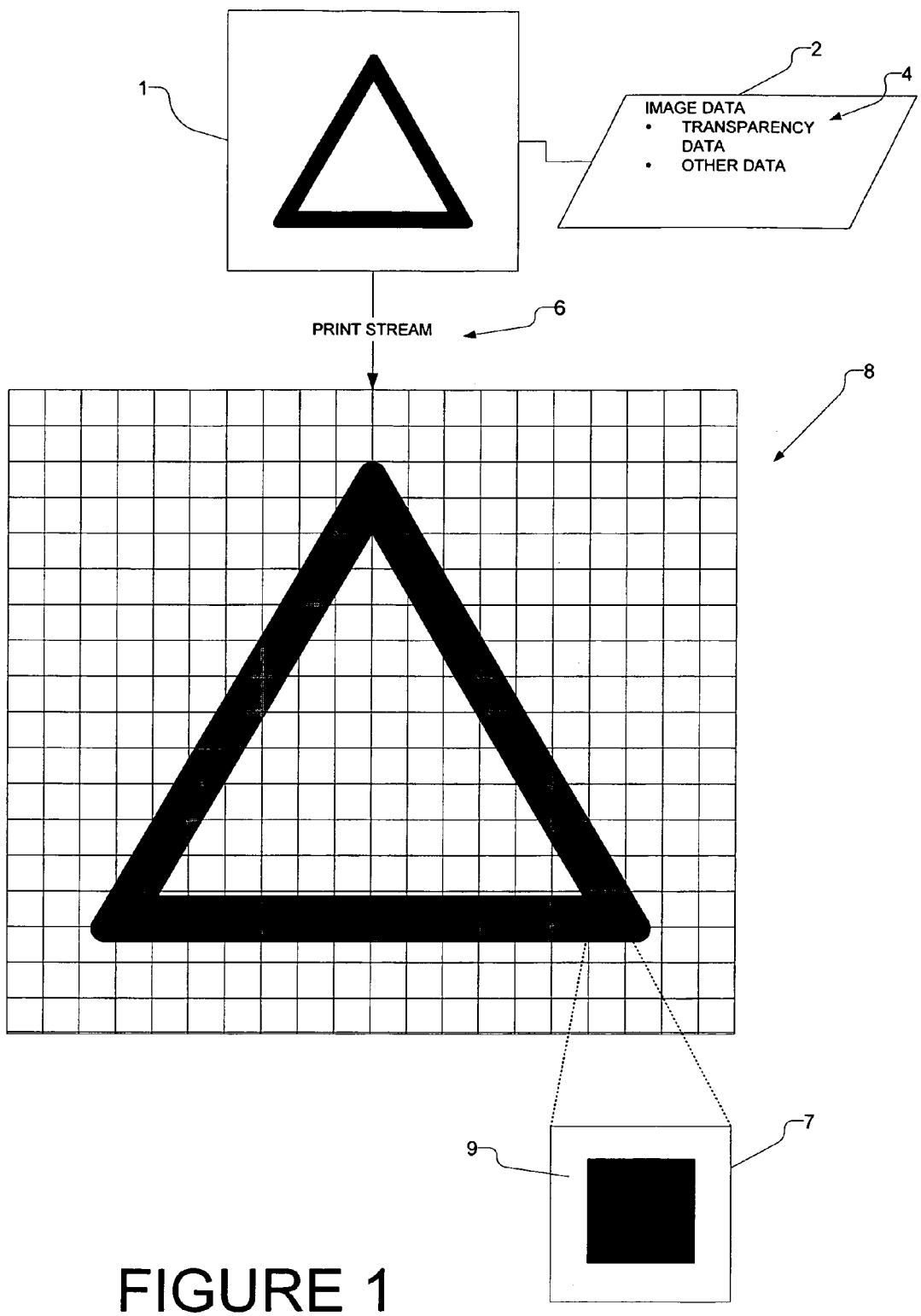
FIG. 1 is a diagrammatic representation of a prior art method of creating a transparency effect in a print created document by the generation of multiple micro images arranged in a sieve formation.
Figure 2:
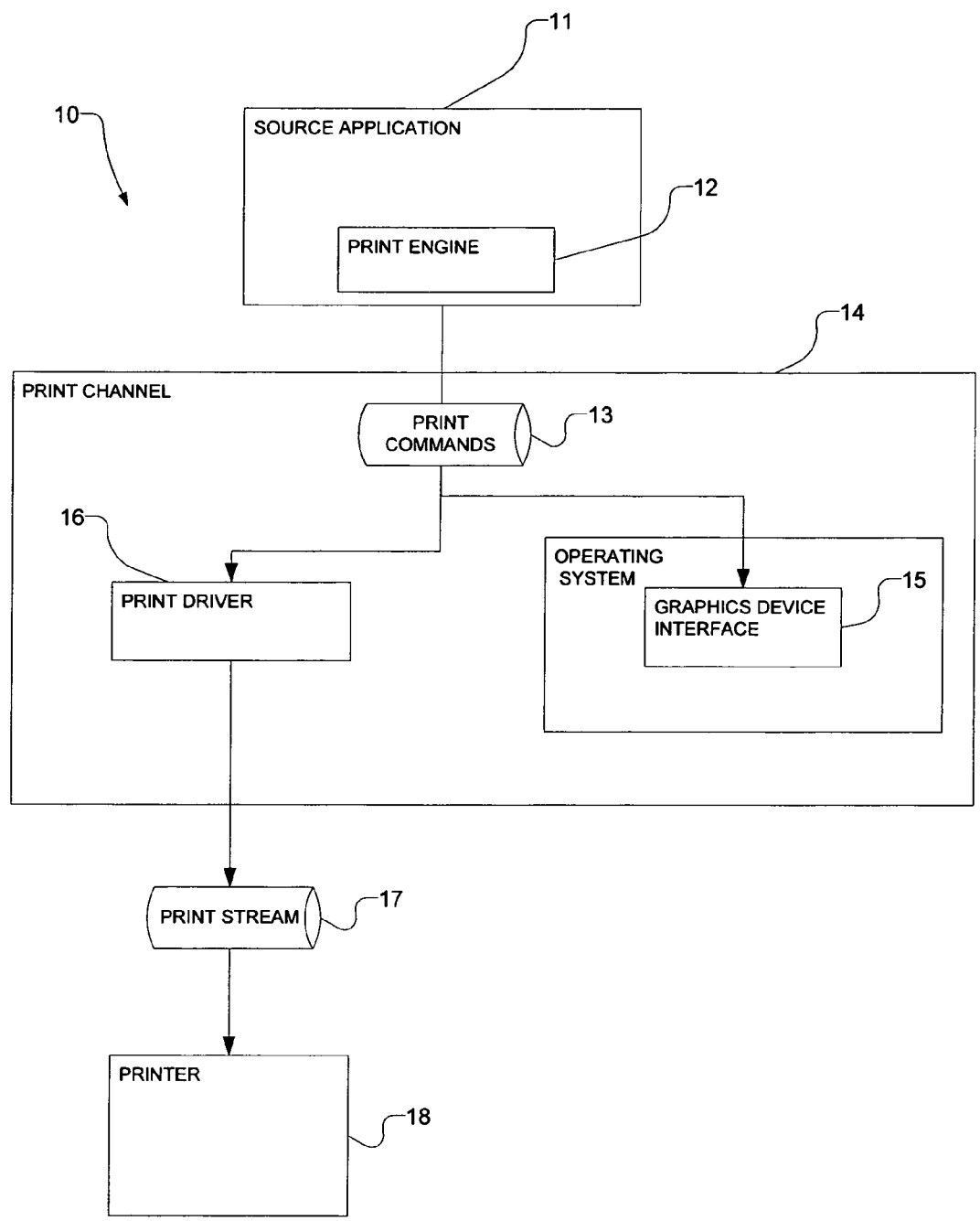
FIG. 2 is a block diagram illustrating an example print system architecture within which an embodiment may be deployed.

FIG. 2 is a block diagram illustrating an example print system architecture 10 within which an embodiment may be deployed. A source application 11 includes a print engine 12 that issues print commands 13 (e.g., in the case of the Windows operating system, Graphics Device Interface (GDI) commands) to a print channel 14. The source application 11 sends print commands 13 for elements of the document (not shown). Document elements may include drawing objects (e.g., text, vector drawings, and rasters).

The print channel 14 includes a graphics device interface (GDI) 15, which may be a part of an operating system resident on a computer system. The GDI 15 provides functions and related structures to the source application 11 that can be used to generate graphical output for displays, printers and other devices.

The print channel 14 further includes a print driver 16, which operates to trap print commands 13 issued by the print engine 12, and to generate a print description language (e.g., PostScript®) based on the trapped print commands 13.

An inability to represent image transparency in either a print driver 16 or a graphics device interface 15 (e.g., provided by an operating system) may result in limitations on the representation of transparency in a print created document (e.g., a PDF document).

Figure 3:
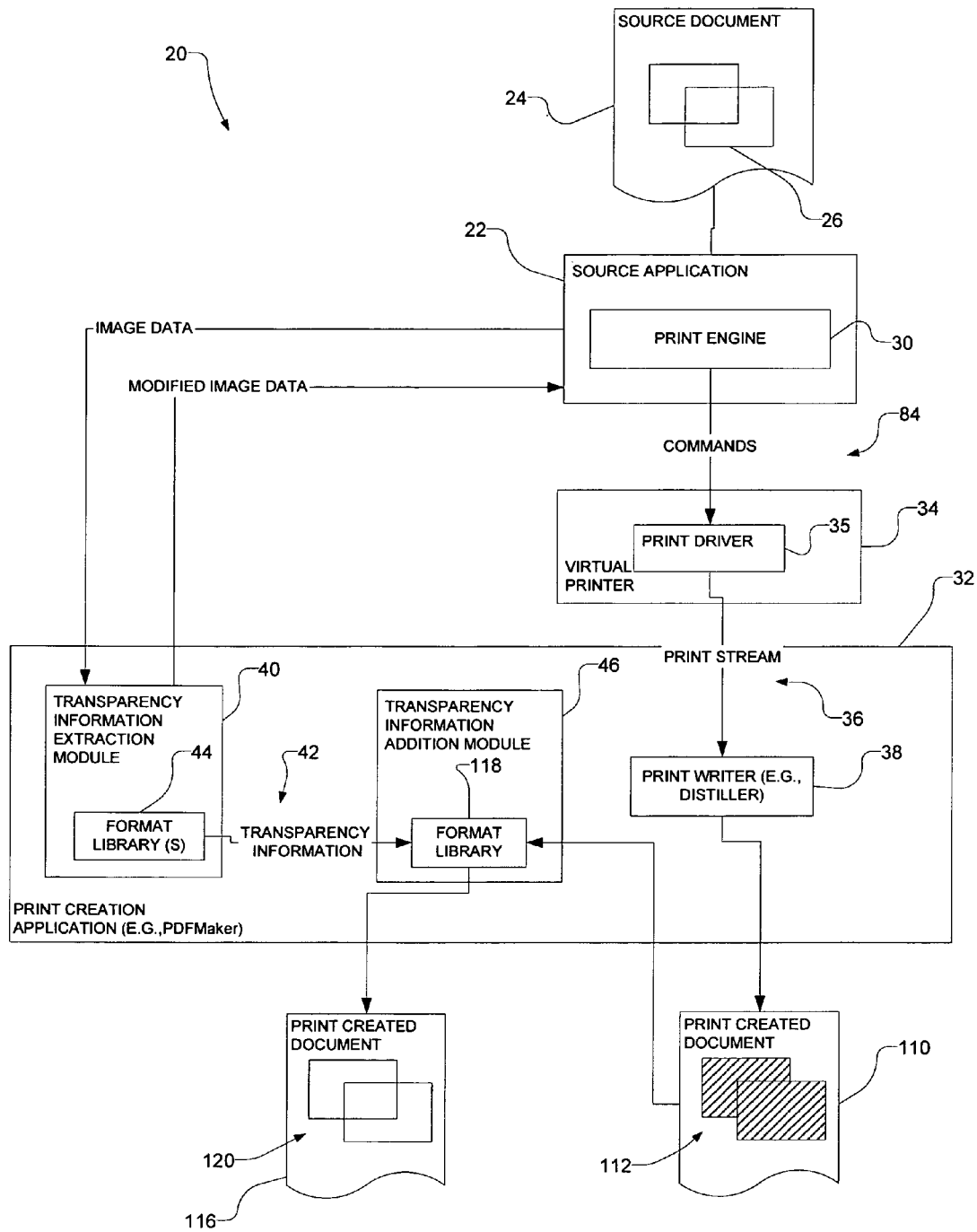
FIG. 3 is a block diagram illustrating a system, according to a first example embodiment, to generate image transparency in a file created from a print stream.

FIG. 3 is a block diagram illustrating system 20, according to an example embodiment, to generate image transparency in a file created from a print stream. A source application 22 (e.g., Microsoft Word, Excel, PowerPoint, Publisher) is utilized by a user to create a source document 24 (e.g., a Word, Excel, PowerPoint or Publisher document) that includes one or more document elements 26. These document elements may, for example, comprise text, vector (e.g., lines, curves, Beziers, rectangles etc) or image elements. The document elements 26 of the particular document 24 are arranged in a z-order, with every document object having a unique z-order within the document 24.

Considering an image 26 as example document element, an image 26 may have a degree of transparency. For example, the image 26 may be formatted according to any one of a number of well known image formats (e.g., PNG, GIF, TIFF, etc.) that support transparency information. Certain image formats allow transparency information to be associated with an image. For example, the PNG format offers a variety of transparency options. With truecolor and grayscale images, either a single pixel value may be declared as transparent, or an alpha channel may be added for the purposes of providing transparency information. For paletted images, alpha values may also be added to paletted entries, and provide transparency information in this manner.

Figure 4:
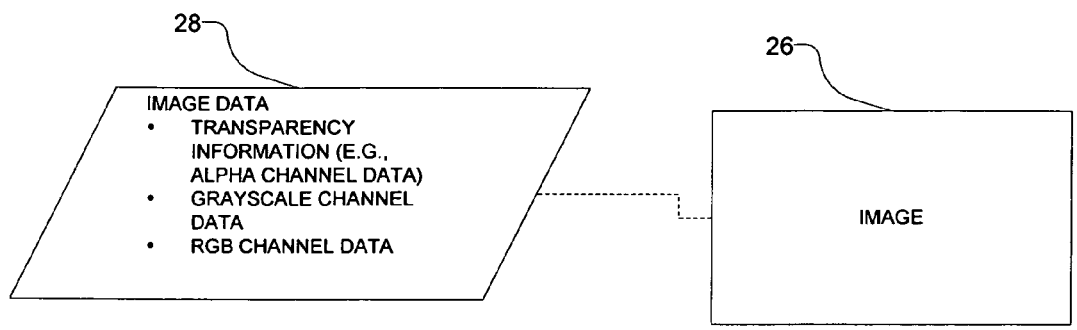
FIG. 4 is a diagrammatic representation of an image and associated image data which may be processed, according to various example embodiments.

FIG. 4 is a block diagram illustrating an image 26 having associated image data 28 including alpha channel data, grayscale channel data and RGB (red, green, blue) channel data, merely for example.

The GIF format, on another hand, does not support alpha channel transparency. However, as GIF is palette-based, optionally one of the colors in the palette can be set as transparent, hence achieving simple binary transparency. In any event, it will be appreciated that, dependent on the format according to which an image 26 is created, transparency information may be associated with the image in any number of ways.

FIG. 3 also illustrates that the source application 22 includes a print engine 30 that provides print commands 84 to a graphics device Interface (GDI) of an appropriate operating system, and to the print drivers of one or more printers (e.g., digital document printers or physical printers, such as laser, inkjet and dot matrix printers) for the purposes of digital and physical document creation. Specifically, while printing, the print engine 30 may send print commands 84 for document objects in the z-order of such objects within the document 24.

Accordingly, the source application 22 will first "draw" an object having a lowest z-order, followed by objects with higher z-orders.

The system 20 further includes a virtual printer 34, including a print driver 35, and a print creation application 32. The virtual printer 34 may operate to generate an electronic print created document (e.g., a PDF formatted electronic document), as opposed to a physical print created document that would be created by a physical printer. The print driver 35 of the virtual printer 34 generates a print stream 36 based on the print commands received from the print engine 30 of the source application 22. In one embodiment, the virtual printer 34 is a virtual printer associated with the PDFMaker application, developed by Adobe Systems Inc. In other embodiments, the virtual printer 34 may be a virtual printer provided by the Macromedia Flash application, developed by Macromedia, Inc., the AutoCAD application developed by Autodesk, Inc, or by the Windows operating system (e.g., supporting the XPS (XML Paper Specification)).

The print stream 36, generated by the print driver 35 of the virtual printer 34, is received at a print writer 38 (e.g., the Adobe Acrobat Distiller® application, developed by Adobe Systems Inc.), which then produces a print created document based on the received print stream 36. The print writer 38 may form part of a print creation application 32, or may be a standalone application. The print created document may be formatted according to a page description language (e.g., PostScript®), according to the PDF file format or according to the XPS file format developed by Microsoft Corporation of Redmond, Wash. State, merely for example.

The print creation application 32 further includes a transparency information extraction module 40 and a transparency information addition module 46. The extraction module 40 accesses a source file (e.g., the source document 24) generated by the source application 22 (in a manner that will be described in further detail below) for the purposes of extracting transparency information 42 from images within the source file. To this end, the extraction module 40 may include, or be configured to invoke, one or more image format libraries 44 (e.g., a PNG, TIFF, or GIF library) to facilitate the extraction of the transparency information 42. The extracted transparency information 42 is communicated from the extraction module 40 to the addition module 46 which, at a high level, operates to reapply (or re-associate) the extracted transparency information 42 with images included in a print created document generated by the print writer 38. To facilitate the re-association of the extracted transparency information 42 with images of a print created document, the addition module 46 may include a format library (e.g., a PDF library) to enable the re-association. Further details regarding the functioning of, and interactions between, the various components described with reference to FIG. 3 are provided below.

Figure 5:
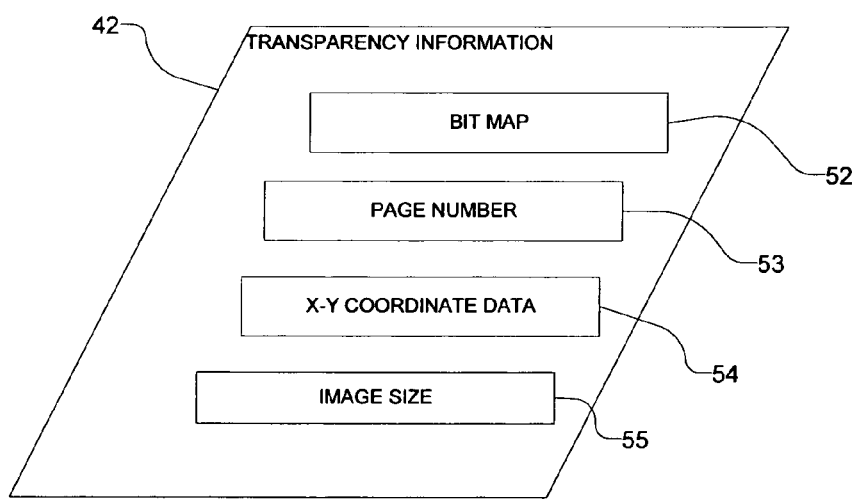
FIG. 5 is a diagrammatic representation of transparency information which may be processed, according to various example embodiments.

FIG. 5 is a block diagram illustrating transparency information 42, according to an example embodiment, for a document element (e.g., an image) that may be extracted by the extraction module 40 for provision to the addition module 46. In the example embodiment, the extracted transparency information 42 may include a raw, single-channel bitmap file 52, page number data 53 identifying a page in a source file at which the image is located within the source file, X-Y coordinate data 54 identifying coordinates at which the image is located on a specific page of the source file, and image size (e.g., pixel count) data 55 specifying the size of the image within the source file. The generation and utilization of the transparency information 42 will again be discussed below with reference to a number of flow charts.

Figure 6:
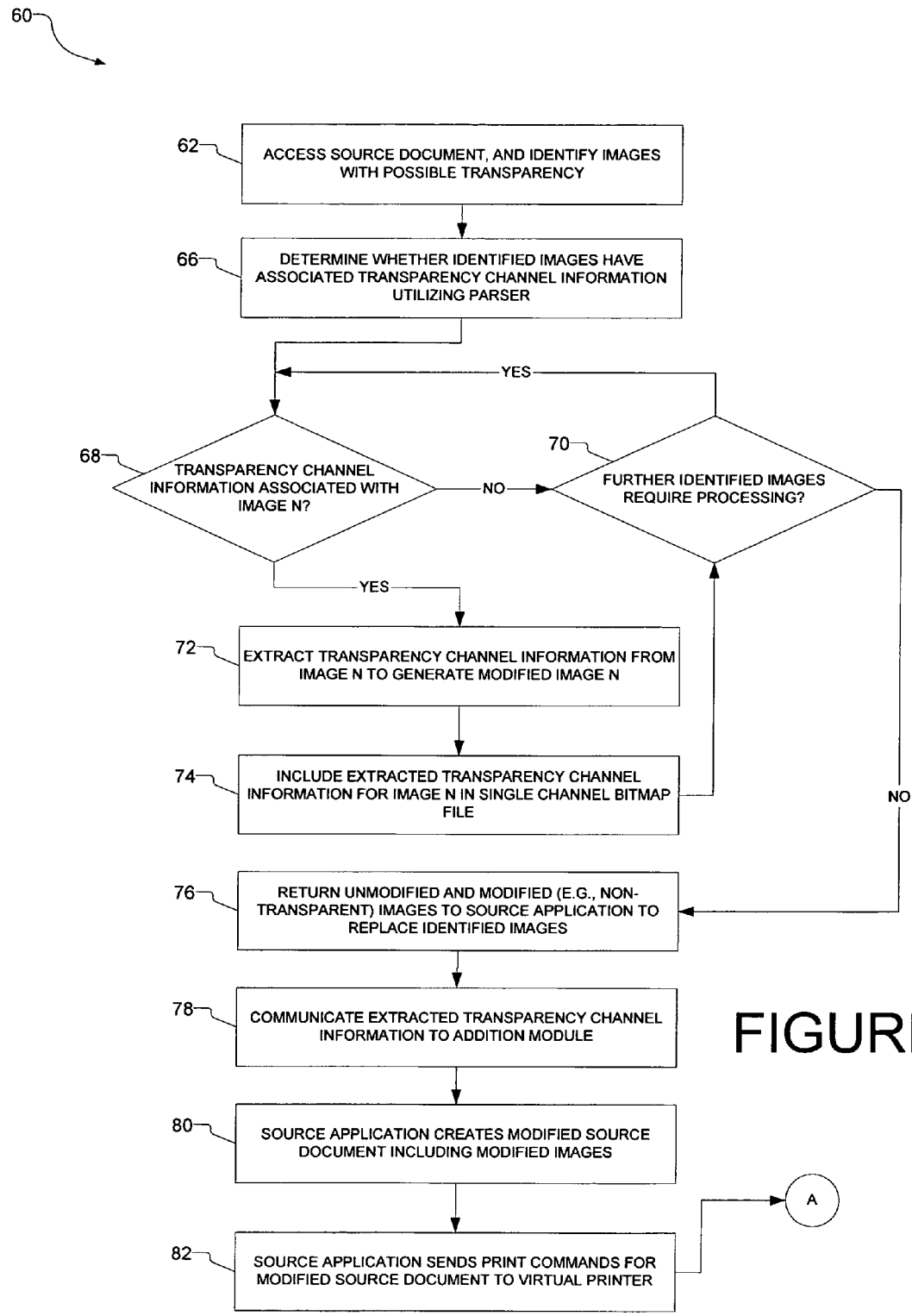
FIG. 6 is a flow chart illustrating the method, according to an example embodiment, to extract transparency information from one or more images included in a source document.

FIG. 6 is a flow chart illustrating a method 60, according to an example embodiment, to extract transparency information from one or more document element (e.g., images) included within a source file (e.g., a source document).

The method 60 commences at operation 62 with the transparency information extraction module 40 accessing a source document 24, via the source application 22. This access by the extraction module 40 may be facilitated via one more Application Program Interfaces (APIs) that are exposed by the source application 22, or through other mechanisms. Such other mechanisms may include, for example, utilizing a source document (e.g., Word, PowerPoint etc.) parser to enumerate through document elements (e.g., images) in the source document 24 and to extract image streams.

Having accessed the source document 24, the extraction module 40 then proceeds to identify images within the source document 24 with potential transparency. In one embodiment, where the source application 22 is configured to provide data regarding image type (e.g., PNG, GIF, or TIFF) for images included within the source document 24, this information may be obtained directly from the source application 22. Certain applications (e.g., Microsoft Word), however, do not provide mechanisms for the provision of image type information for images. When interfacing with such source applications 22, the extraction module 40 may copy images within the source document 24 to a memory location (e.g., a clipboard provided by an operating system, such as the Microsoft Windows operating system), from where the extraction module 40 may examine the images to determine whether the images have transparency. Specifically, utilizing a source application API, images may be copied to an operating system supported clipboard. Subsequent to such a copy operation, image data is available through the clipboard in a number of formats. For Microsoft Office applications, PNG is one of the formats available. Further, a clipboard API may be used to access and extract copied image data into one or more supported image formats.

In summary, in one embodiment, image streams for images included within the source document 24 may be extracted in a PNG, GIF, or TIFF format through an operating system clipboard. The extraction module 40 examines these image streams to ascertain whether the relevant images have potential transparency or not.

At operation 66, having identified images with potential transparency, the extraction module 40 proceeds to determine which of the identified images actually have transparency information associated therewith. As noted above, the extraction module 40 may include one or more file format libraries 44. In one example embodiment, the format libraries 44 include a PNG library, which in turn includes a PNG parser (not shown) that is utilized to parse each of the identified images to determine whether alpha channel transparency information is associated with a respective image.

The method 60 then enters a loop for the processing of each image within a source document 24. The loop begins with a decision operation 68, for each identified image, regarding whether or not transparency information is associated with the respective image. If it is determined at decision operation 68 that no transparency information is associated with a particular image, the method 60 proceeds to decision operation 70, where a further determination is made as to whether there are any further identified images that require processing. If not, the method 60 then exits the loop at operation 70, and advances to operation 76.

Returning to operation 68, if it is determined that transparency information (e.g., alpha channel transparency information) is associated with a particular image, the method 60 progresses to operation 72, where the transparency information is extracted from the image, thereby to generate a modified image (e.g., a non-transparent image). This extraction of the transparency information may again be performed by an appropriate parser included within a file format library 44.

At operation 74, the extracted transparency information for the relevant image is then included in a file of extracted transparency information 42 for eventual processing by the transparency information addition module 46. In one example embodiment, the extracted transparency information 42 may include an image transparency channel, associated with the relevant image, which is stored as a raw single-channel bitmap file. With the transparency information extracted therefrom, a modified image generated at operation 72 may be regarded as a non-transparent image.

Upon completion of operation 74, the method 60 then loops back to decision operation 70 to determine whether any further images require processing to extract transparency information. If so, the method 60 continues to loop through operations 68-74, until all identified images have been processed.

At operation 76, the extraction module 40 then returns a set of modified images (and possibly unmodified images), (e.g., all non-transparent images) to the source application 22 so as to enable the source application 22 to replace images within the source document 24 with non-transparent images.

At operation 78, the extraction module 40 makes the extracted transparency information 42 available to the transparency information addition module 46 for further processing.

At operation 80, the source application 22 creates a modified source document (not shown) including the non-transparent images received at operation 76. The source application 22, at operation 82, communicates print commands 84, for printing of the modified source document, to the printer driver 35 of the virtual printer 34.

In one embodiment, when modifying the source document 24, as described above, the transparency information extraction module 40 may insert a marker adjacent (e.g., before) an image from which the transparency channel information has been extracted, in the z-order, utilizing an API exposed by the source application 22. The inserted marker may, in one embodiment, be an invisible line object. These markers are accordingly included in print streams and print created documents generated based on the modified source document 24. The transparency information addition module 46 of the print creation application 32 may utilize these markers to identify images, within a first version of a print created document 110, from which transparency information has been extracted.

Figure 7:
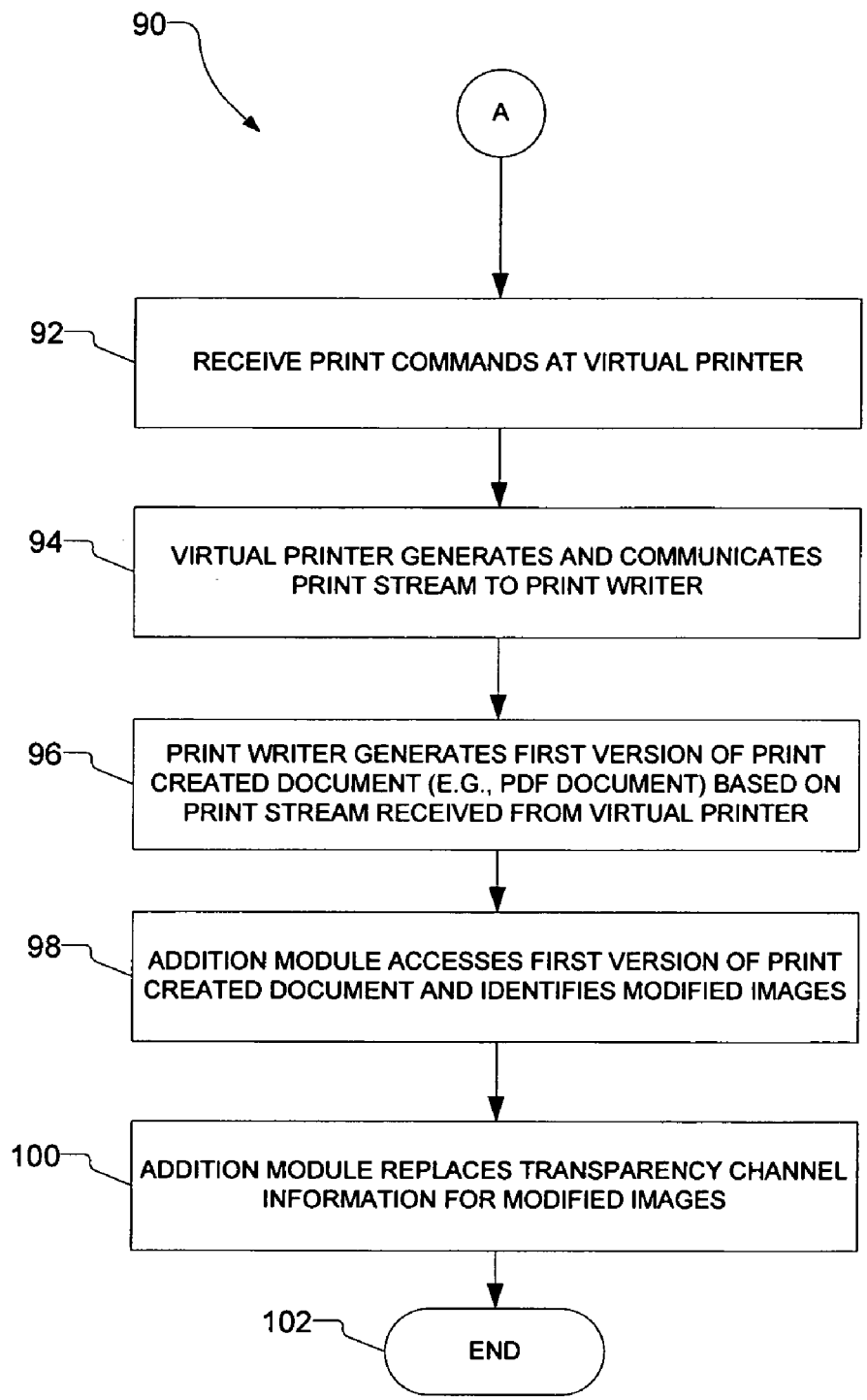
FIG. 7 is a flow chart illustrating a method, according to a first example embodiment, to re-associate transparency information with one or more modified images included in a print stream.

FIG. 7 is a flow chart illustrating a method 90, according to an example embodiment, to re-associate transparency information with one or more non-transparent images included in a print stream generated by the printer driver 35 of a virtual printer 34. The print commands 84 are received, at operation 92, at the printer driver 35 of virtual printer 38 from the print engine 30 of the source application 22. The print driver 35, at operation 94, then proceeds to generate and communicate a print stream 36 to the print writer 38 of the print creation application 32.

The print writer 38, in turn, generates a first version of a print created document 110 (e.g., a PDF document) based on the print stream 36 received from the virtual printer 34. Of course, where the print creation application 32 supports other formats and types of print created documents, such documents may also be created at operation 96.

It will be appreciated that, as the print commands 84, from which the print stream was generated, included only non-transparent images, the first version of the print created document 110 will similarly be printed to include non-transparent images 112 (including images from which transparency information has been extracted).

The transparency information addition module 46, at operation 98, then retrieves the first version of the print created document 110 and identifies, within this document 110, modified images from which the transparency information 42 was previously extracted by the extraction module 40. The identification of modified images by the addition module 46 may be performed utilizing markers, previously inserted into a modified source document 24 from which the document 110 is created, as described above with reference to FIG. 6.

In one embodiment, the identification of such modified images within the first version of the print created document 110 may also be achieved utilizing the transparency information 42 described above with reference to FIG. 5. For example, the page number data 53, and the X-Y coordinate data 54 may be utilized by the addition module 46 to identify locations within the print created document 110 at which modified images are located, and the image size data 55 may be utilized to determine the boundaries of these images.

As is the case with the source document 24, the print created document 110 may include text, vector and image elements. Operation 100 may be performed to identify all images within the print created document 110 from which transparency was extracted, by the extraction module 40, from the source document 24.

At operation 100, the addition module 46, having identified modified images at operation 98, then proceeds, at operation 100, to re-associate (e.g., by replacing) the transparency information (e.g., the alpha channel transparency information) that was previously extracted via the extraction module 40 from the modified images. Again, this operation may be supported utilizing the bitmap file 52, which is included in the extracted transparency information 42 provided from the extraction module 40 to the addition module 46. This bitmap, as noted above, may comprise a raw, single-channel bitmap file representation of the extracted image transparency channel information for each of the modified images.

In one example embodiment, the re-association of the transparency information with the previously modified images is achieved by the removal, by the addition module 46, of the images in the first version of the print created document 110, the re-association of the transparency information with these remove images, and the replacement of the now-transparent images back into the first version of the print created document 110 to thereby generate a second version of the print created document 116.

In a further example embodiment, the re-association of the transparency information with the previously modified images may be achieved by reapplying the transparency information to the modified images directly in the first version of the print created document 110, without the removal of the previously modified images from the print created document 110.

In the example embodiment in which the second version of the print created document 116 is a PDF document, the print created document 116 may be generated utilizing an appropriate format library 118 (e.g., a PDF library) that forms part of the addition module 46. Accordingly, the second version of the print created document 116 includes images 120 that have the same (or at least a similar) transparency characteristics as the images included within the original source document 24.

The method 90 then terminates at operation 102.

Figure 8:
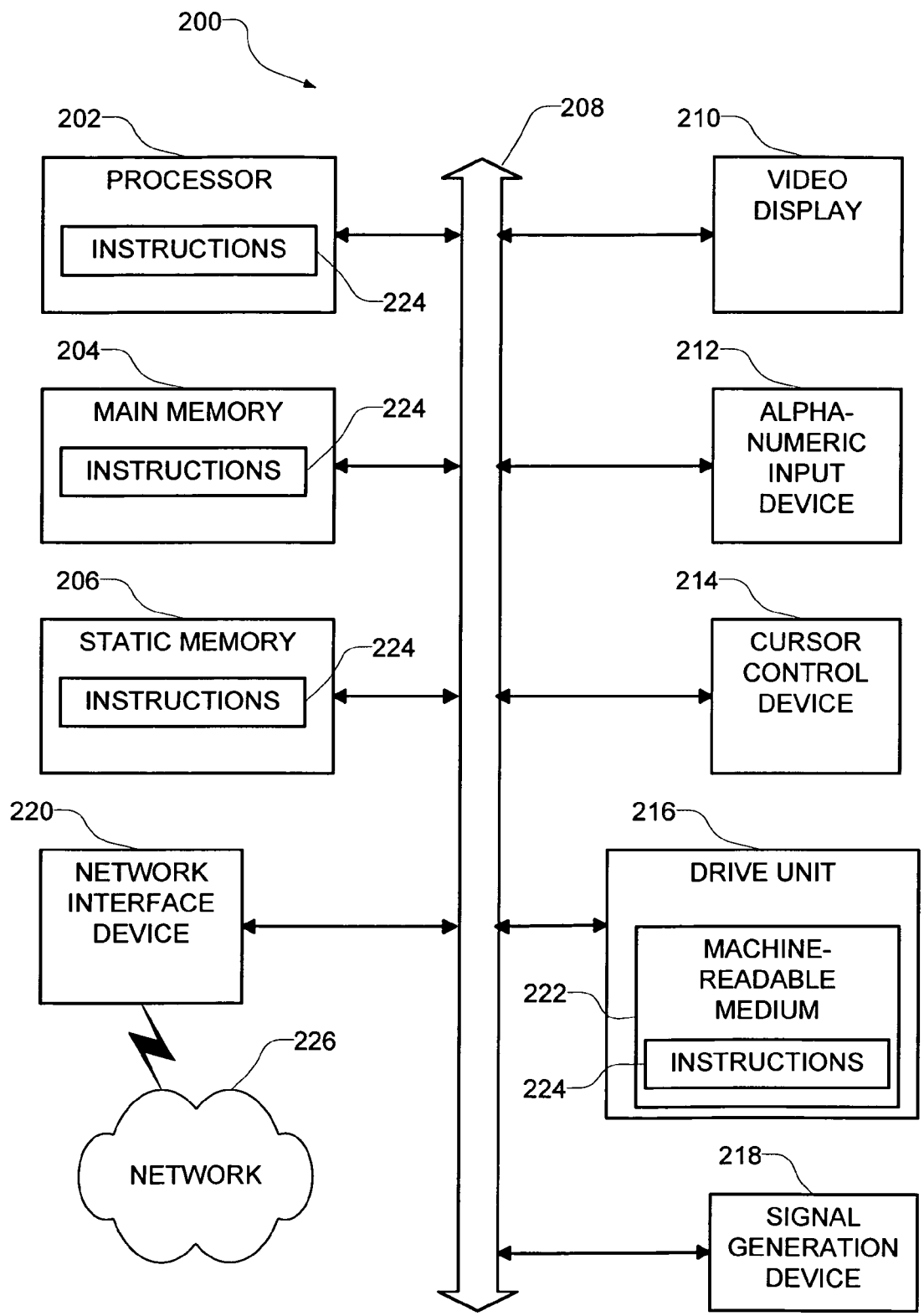
FIG. 8 shows a diagrammatic representation of machine in the example form of a computer system within which a set of instructions, for causing the machine to perform any one or more of the methodologies discussed herein, may be executed.

FIG. 8 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., liquid crystals display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
    a transparency information extraction module to access a source file associated with a source application, and to extract transparency information from an image of the source file to generate a non-transparent image, the extraction of the transparency information being performed prior to the source application generating a print stream based on the source file; and
    a transparency information addition module to replace the transparency information in a print created file created utilizing the print stream.

2. The system of claim 1, wherein the transparency information extraction module is to extract transparency channel information associated with the image within the source file.

3. The system of claim 2, wherein the transparency information extraction model is to determine whether transparency channel information is associated with the image.

4. The system of claim 1, wherein the transparency information extraction model is to extract the transparency information from the image as a single-channel bitmap file.

5. The system of claim 1, wherein the transparency information extraction module is to replace the image within the source file with the non-transparent image, prior to the source application generating the print stream based on the source file.

6. The system of claim 5, wherein the transparency information addition module is to:
    extract the non-transparent image from the print created file;
    re-associate the transparency information with the extracted non-transparent image to generate a transparent image; and
    replace the non-transparent image of the print created file with the transparent image.

7. The system of claim 1, wherein the transparency information addition module is to re-associate the transparency information with the non-transparent image within the print created file.

8. A system comprising:
    first means for accessing a source file associated with a source application, and for extracting transparency information from an image within the source file to generate a non-transparent image, the extraction of the transparency information being performed prior to the source application generating a print stream based on the source file; and
    second means for replacing the transparency information in a print created file created from the print stream.

9. A method comprising:
    accessing a source file of a source application;
    using one or more processors to perform at least a portion of one or more of the following:
        extracting transparency information from an image within the source file to generate a non-transparent image, prior to generating a print stream based on the source file; and
        replacing the transparency information in a print created file generated utilizing the print stream.

10. The method of claim 9, wherein the extracting of the transparency information from the image includes extracting transparency channel information associated with the image.

11. The method of claim 9, wherein the extracting of the transparency information channel from the image includes determining whether transparency channel information is associated with the image.

12. The method of claim 9, wherein the transparency information is extracted from the image as a single-channel bitmap file.

13. The method of claim 9, including replacing the image within the source file with the non-transparent image, prior to generating the print stream utilizing the source file.

14. The method of claim 9, wherein the replacing of the transparency information in the print created file includes:
   extracting the non-transparent image from the print created file;
   re-associating the transparency information with the extracted non-transparent image to generate a transparent image; and
   replacing the non-transparent image of the print created file with the transparent image.

15. The method of claim 9, wherein the replacing of the transparency information in the print created file includes re-associating the transparency information with the non-transparent image within the print created file.

16. A machine-readable medium storing instructions that, when executed by a machine, cause the machine to:
   access a source file of a source application;
   extract transparency information from an image within the source file to generate a non-transparent image, prior to generating a print stream based on the source file; and
   replace the transparency information to a print created file generated utilizing the print stream.

* * * * *

UNITED STATES PATENT AND TRADEMARK OFFICE
CERTIFICATE OF CORRECTION

PATENT NO. : 7,583,410 B1  Page 1 of 1
APPLICATION NO. : 11/304321
DATED : September 1, 2009
INVENTOR(S) : Anup et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this

Fourteenth Day of September, 2010

David J. Kappos
*Director of the United States Patent and Trademark Office*